UNITED STATES PATENT OFFICE.

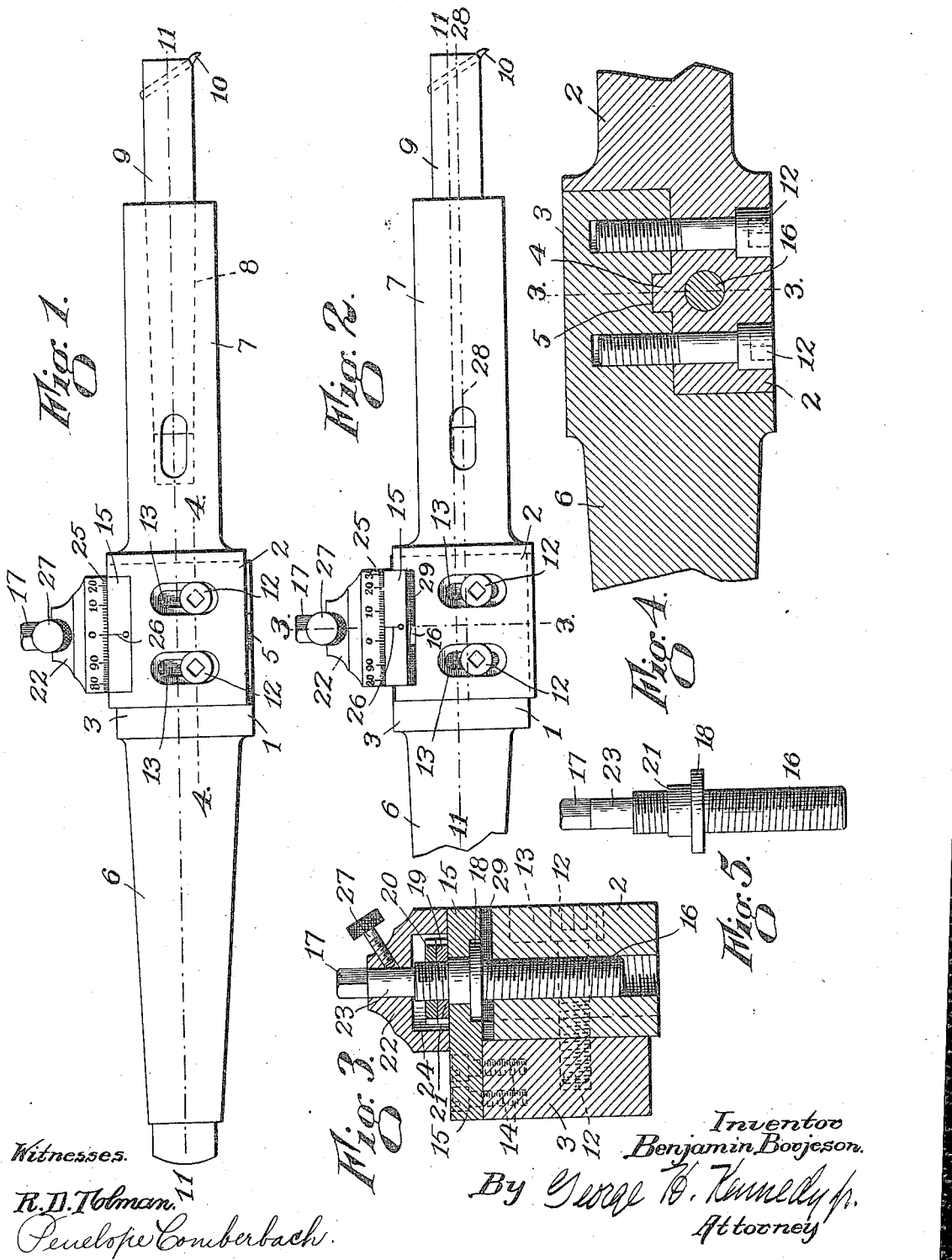

BENJAMIN BORJESON, OF WORCESTER, MASSACHUSETTS, ASSIGNOR OF ONE-HALF TO EDWIN CARLSON, OF WORCESTER, MASSACHUSETTS.

ADJUSTABLE HOLDER FOR BORING-TOOLS.

1,233,174.

Specification of Letters Patent.

Patented July 10, 1917.

Application filed March 1, 1915. Serial No. 11,124.

*To all whom it may concern:*

Be it known that I, BENJAMIN BORJESON, a citizen of the United States, residing at Worcester, in the county of Worcester and Commonwealth of Massachusetts, have invented a new and useful Improvement in an Adjustable Holder for Boring-Tools, of which the following is a specification, accompanied by drawings forming a part of the same.

The objects of my invention are to provide an adjustable holder for a boring tool which is simple and inexpensive in construction, easily adjusted to adapt the boring tool to holes of different diameters, and rigid in operation. These objects among others hereinafter pointed out, I accomplish by the construction and arrangement of parts as hereinafter described, the novel features being pointed out in the annexed claims.

Referring to the accompanying drawings,

Figure 1 represents a side elevation of my improved holder.

Fig. 2 is a side elevation of a portion of the holder, showing the parts in different positions of adjustment.

Fig. 3 is a transverse sectional view on the plane of the broken line 3—3, Figs. 2 and 4.

Fig. 4 is a transverse sectional view through the head or central portion of the holder on the plane indicated by the line 4—4, of Fig. 1.

Fig. 5 is a detached view of the actuating screw for adjusting the holder.

Similar reference characters refer to similar parts throughout the different figures.

My improved boring tool comprises a rectangular head 1 consisting of two parts 2 and 3, overlapping each other, with the part 2 transversely adjustable on the part 3. The part 2 is guided in its transverse movement by a tongue 4 sliding in a groove 5. That part of the head marked 3 is provided with a tapered shank 6 adapted to be inserted in a rotating spindle. That part of the head marked 2 is provided with a cylindrical extension 7 having a longitudinal tapered hole 8 to receive the tapered shank of a boring tool 9, carrying any suitable cutting tool 10. When the parts 2 and 3 of the head are in their normal position the axis of the shank 6 and that of the boring bar 9 coincide, as indicated by the broken line 11—11, Fig. 1.

In this position the radius of the hole bored is determined by the distance between the axis 11—11 and the tip of the cutting tool 10. The parts 2 and 3 of the head are clamped together by clamping screws 12, 12, held in the part 3 and passing through slots 13, 13 in the part 2. Attached to the part 3 of the head by screws 14 is a plate 15 overlapping the adjustable part 2 of the head and carrying an adjusting screw 16 having a polygonal tip 17 for the application of a wrench.

The screw 16 is held from longitudinal movement in the plate 15 by means of a collar 18 integral with the screw and a nut 19 and check nut 20, the former being screwed against a shoulder 21 on the screw 16, thereby holding the screw from longitudinal movement but permitting its free rotation. The screw 16 engages the part 2 by a left hand thread, permitting the device to be adjusted for larger sized holes by a right hand movement of the screw. When the parts have been assembled a collar 22 is applied to a plain shank 23 of the screw 16 and resting upon the plate 15. The collar 22 is provided with a recess 24 to receive the nuts 19 and 20. Upon the lower edge of the collar 22 is a graduated surface 25 which is adjusted to bring an index line 26 on the end of the plate 15 in alinement with the zero mark of the graduated surface 25. The collar 22 is then attached to the plain shank 23 of the screw 16 by means of a thumb screw 27, causing the collar 22 to rotate with the screw 16, and the combination between the graduated surface 25 and the pitch of the screw is such that a transverse adjustment of the cutting tool may be readily determined.

In Fig. 1, the axis of the tapered shank 6 and that of the extension 7 are in alinement as indicated by the broken line 11. In Fig. 2, the cutting tool is represented as adjusted to cut a larger hole with the axis of the extension offset as indicated by the broken line 28, and with the part 2 moved away from the plate 15, leaving a space as shown at 29, Figs. 2 and 3.

I am aware that it has been proposed to vary the size of the hole by offsetting the cutting tool, also that this has been accomplished by the employment of an adjusting screw. I am also aware that a graduated surface has been employed to indicate the rotative movement of the adjusting screw, and I do not claim either of these features broadly.

By my present improvement I simplify the construction of tools of this class, and increase their rigidity and consequent accuracy of operation.

I claim,

1. A holder for a boring tool, comprising a head formed in two parts, one stationary and one movable, having overlapping surfaces, a plate held by said stationary part, an adjusting screw held from longitudinal movement in said plate and engaging said movable part, and a graduated cap carried by said screw outside said plate, and means for adjustably attaching said cap to said screw, whereby the graduations may be adjusted relative to the position of the movable part of the head.

2. A holder for a boring tool, comprising a rectangular head formed in two parts one stationary and one movable, having overlapping surfaces, a plate detachably held by said stationary part, an adjusting screw having a fixed collar bearing against the inner side of said plate, a check nut carried by said adjusting screw and bearing against the outer side of said plate, a cup shaped graduated index plate adjustably held on said adjusting screw and forming a cover for said check nut.

3. A holder for a boring tool, comprising a head formed in two parts, one stationary and one movable, an adjusting screw held from longitudinal movement relatively to said stationary part and engaging said movable part, a graduated member carried by said screw, and means for adjustably connecting said graduated member with said screw.

Dated this 23rd day of February 1915.

BENJAMIN BORJESON.

Witnesses:
PENELOPE COMBERBACH,
NELLIE WHALEN.

Copies of this patent may be obtained for five cents each, by addressing the "Commissioner of Patents, Washington, D. C."